INVENTORS.
SEYMOUR KOPP
BENNO HERZ.
BY
Percy Freeman
ATTORNEY.

AUTOMATIC TELEPHONE ATTENDANT

INVENTORS.
SEYMOUR KOPP.
BENNO HERZ.
BY [signature]
ATTORNEY.

March 8, 1955 S. KOPP ET AL 2,703,821

AUTOMATIC TELEPHONE ATTENDANT

Filed Dec. 29, 1950 3 Sheets-Sheet 3

INVENTORS.
SEYMOUR KOPP.
BENNO HERZ.

BY Percy Freeman

ATTORNEY.

United States Patent Office 2,703,821

Patented Mar. 8, 1955

2,703,821

AUTOMATIC TELEPHONE ATTENDANT

Seymour Kopp, New York, and Benno Herz, Flushing, N. Y.

Application December 29, 1950, Serial No. 203,410

7 Claims. (Cl. 179—6)

The present invention relates to an automatic telephone attendant.

Generally speaking, the invention provides apparatus for use with the conventional telephone set. It is adapted to answer, in response to the ringing signal, and to deliver a transcribed message to the caller acquainting him with the fact that the telephone is mechanically attended and inviting the caller to leave a message which the attendant will record. Previous attempts have been made to accomplish the above, and the present invention is intended as an improvement over apparatus presently known.

An object of the invention is to provide automatic telephone answering equipment of the above character, which operates independently of the position of the handset on the cradle.

A further object of the invention is to provide means for automatically disabling the responder equipment when the telephone is operated manually.

The invention further provides novel means for timing the outgoing and incoming messages as well as novel means for adjusting the intervals of both.

A better understanding of the invention, and a fuller appreciation of the advantages thereof will be had from reading the following detailed description taken in connection with the accompanying drawings, in which.

Figures 3, 4, 8:
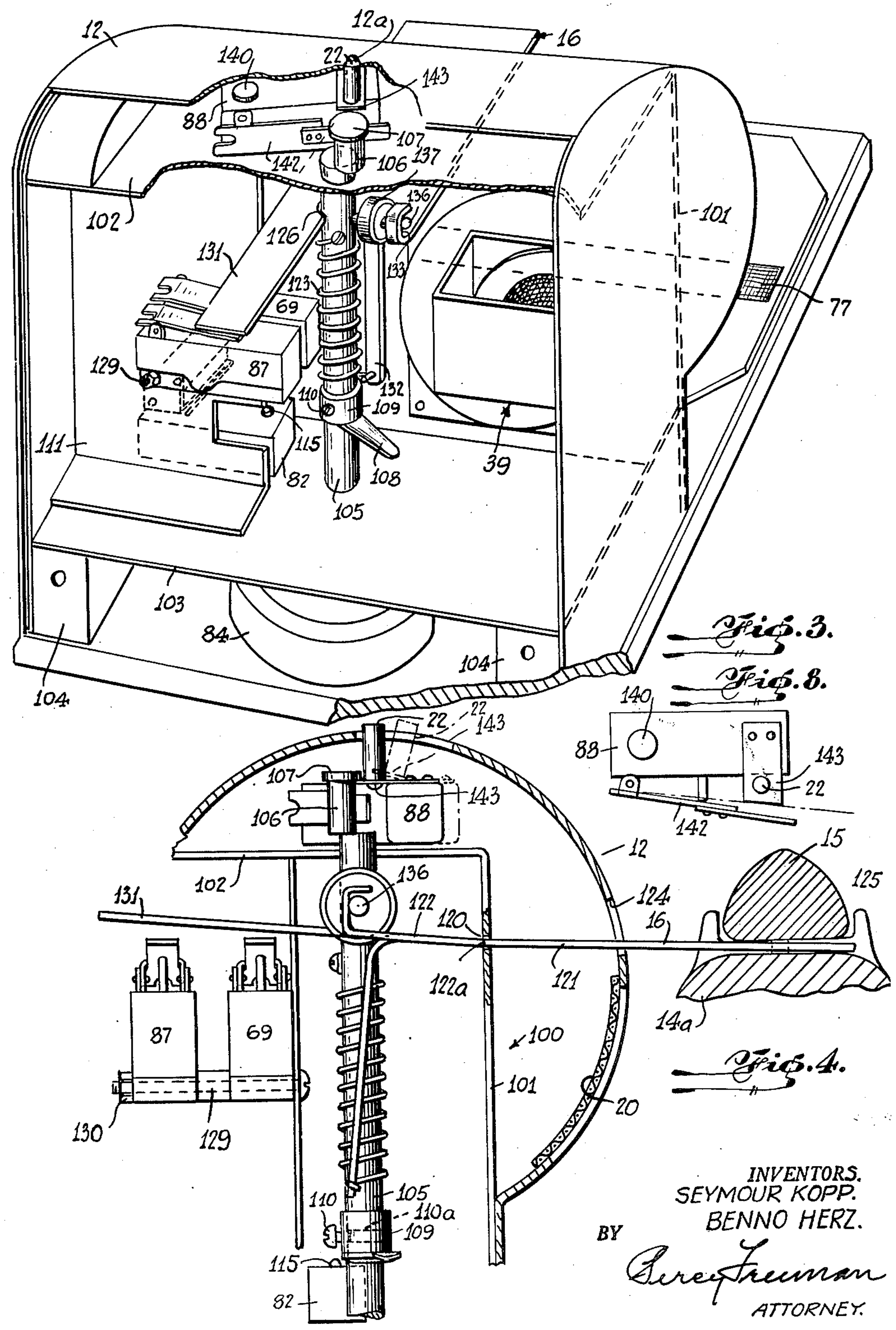
Fig. 3 is a perspective view partly in section, showing the internal organization of electrical and mechanical components of the apparatus.
Fig. 4 is a longitudinal sectional view taken in a vertical plane through Fig. 3, showing further details of the mechanical components.
Figures 5, 6, 7, 7A:
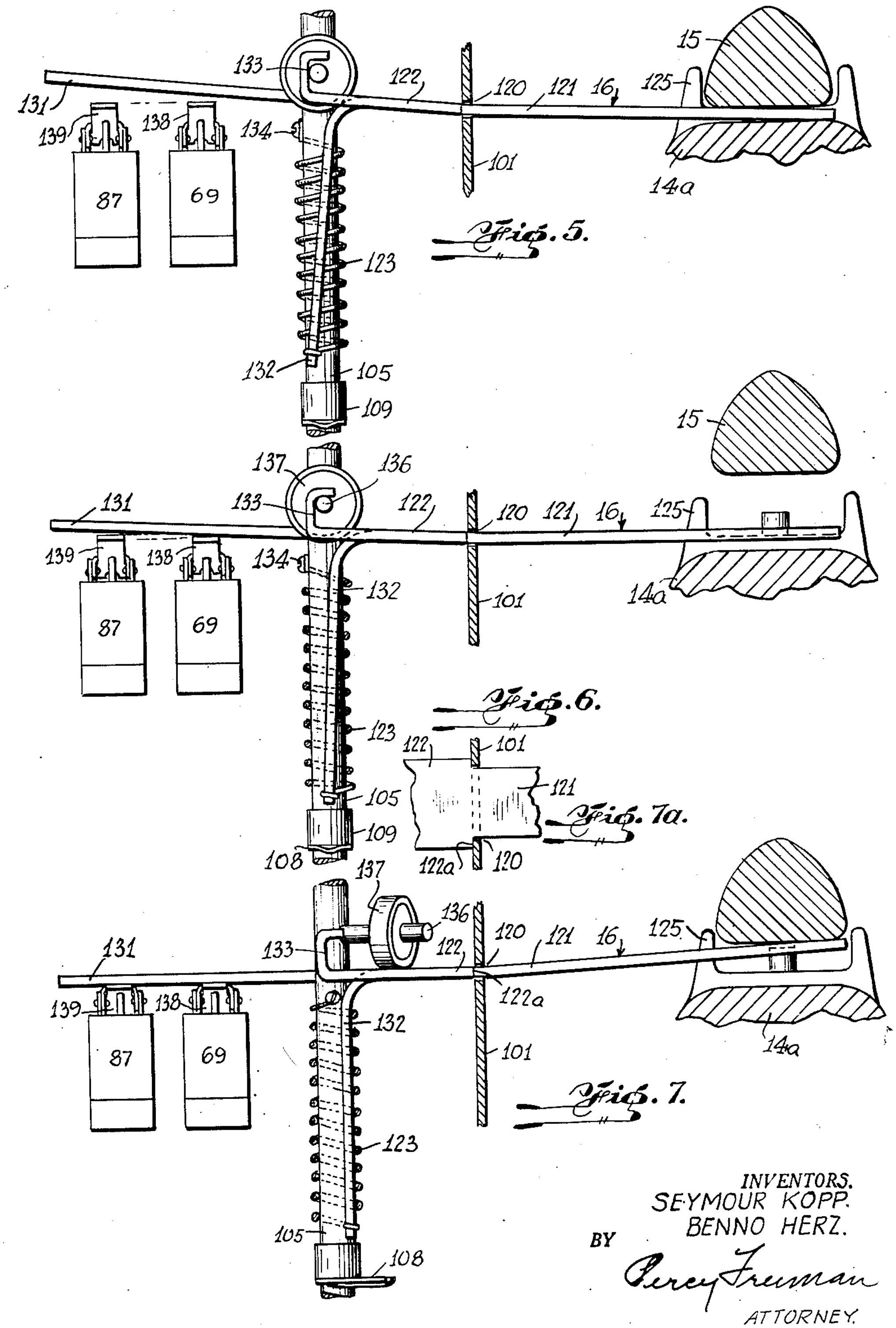

Figs. 5, 6, and 7 are fragmentary views partly in section, showing the components of Fig. 4, in different positions of adjustment.

Fig. 7*a* is a fragmentary view of a detail of the invention.

Fig. 8 is a plan view of one of the electrical switches in Fig. 3, showing a detail in the mechanism for its adjustment.

Figure 1:
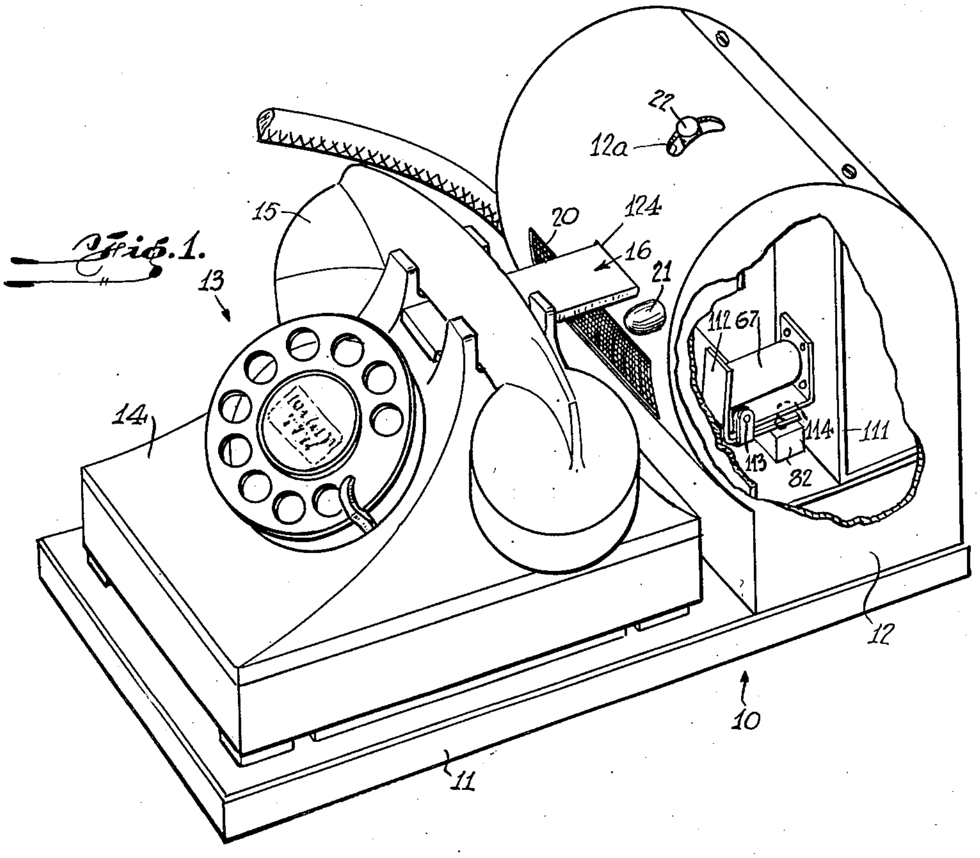
Fig. 1 is a perspective view showing a telephone set operatively associated with the controller unit of the automatic attendant of the present invention.

Referring now to Fig. 1, there is shown generally at 10 the controller of our improved telephone attendant unit having a base 11 and a housing 12 mounted at one end thereof. A telephone set 13, consisting of the conventional bell box, dial, and cradle, designated generally by the numeral 14, and handset 15, is arranged on the base plate 11 so that the lifting tongue or lever 16 emerging from the housing 12 extends under the center of the handset 15 between it and the cradle. A grill 20 communicating with a speaker sound chamber, the details of which will be explained below, is positioned in a wall of the housing adjacent the handset for communicating the outgoing message to the handset microphone. It should be noted here that the grill extends over substantially the entire width of the housing and is, therefore, proximate to either end of the handset. As a result, it is immaterial on which side of the cradle the transmitter unit of the handset is located. The user of the telephone, therefore, is not constrained to replace the handset in one, and only one position, on the cradle.

Still referring to Fig. 1, 21 is a small neon type lamp for indicating when an incoming message is being supervised, while 22 is a time set button to be described later.

Figure 2:
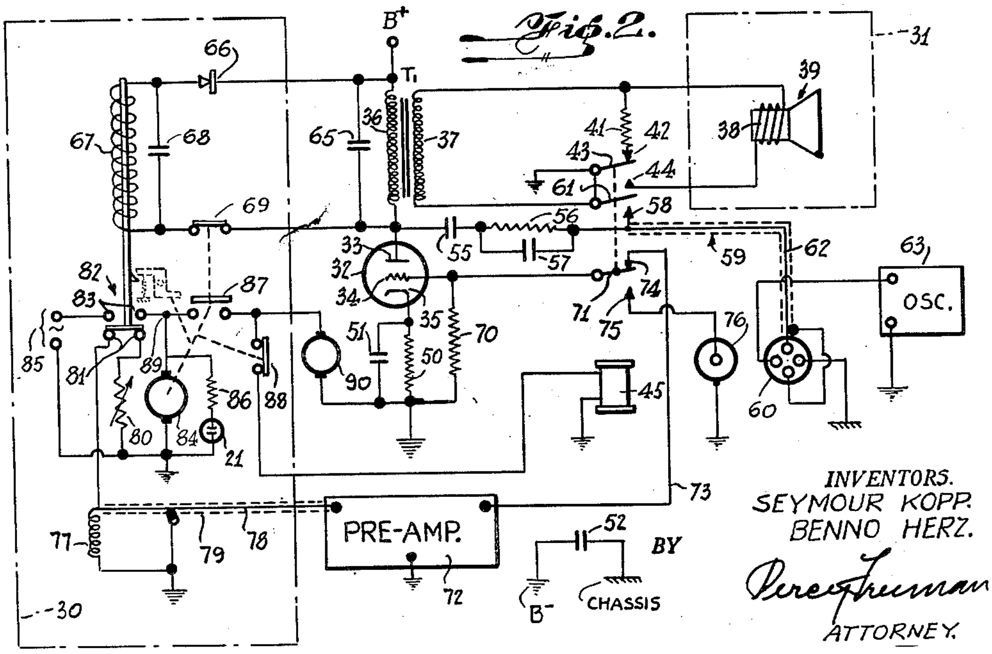
Fig. 2 is a schematic wiring diagram illustrative of the operating circuits of the invention.

For a general description of the electrical components of the device, reference will now be had to the schematic diagram in Fig. 2. It is to be understood that the circuit shown is purely schematic in nature and merely illustrative of the physical components to be described below in connection with Figs. 3 to 8, inclusive. It includes the elements found in the controller unit referred to above, and additional components which are located in the transponder equipment.

The elements included within the dot-dash lines 30 and 31 are located in the controller unit. Considering both units together, there is provided an output amplifier comprising tube 32 which is shown as a triode having a plate 33, a control grid 34 and a cathode 35. It is to be understood that a triode has been illustrated merely for convenience, and that any suitable vacuum tube may be used such as a tetrode or pentode. The plate 33 of the tube is connected with a source of operating voltage designated as $B^+$ by means of the primary winding 36 of output transformer T1. The cathode 35 is connected to a point of reference potential designated as ground by means of cathode bias resistor 50 shunted by a by-pass capacitor 51. In the present case, the negative terminal $B^-$, of the source of operating voltage is connected to ground which may be isolated from the chassis of the apparatus by a capacitor 52.

A first output circuit for the amplifier consists of secondary winding 37 of transformer T1 which has one end connected to ground and the other end connected to resistor 41 and to voice coil 38 of speaker 39. The other end of voice coil 38 is connected to relay contact 44 while the resistor 41 has its free end connected to back contact 42. In the position shown, armature 43, which is controlled by solenoid 45, connects contact 42 to ground to thereby shunt winding 37. At the same time, the speaker circuit is open.

Another output circuit consists of a coupling capacitor 55 which has one side connected directly to plate 33 and the other side connected to a filter network comprising resistor 56 in parallel with capacitor 57. The other end of the filter circuit is connected to relay contact 58 and through shielded cable 59 to a four prong socket 60. A second relay armature 61 is shown associated with contact 58 and connected to ground. Socket 60 is provided for connecting a magnetic recording head to the amplifier output. One terminal is shown connected to the inner conductor 62 of cable 59 while a second terminal is connected to the shield. A third terminal is connected to the chassis while the fourth terminal is connected to the output of an erasing oscillator 63.

A third output circuit is provided for the amplifier tube connected in parallel with the transformer primary winding 36. It comprises a capacitor 65 connected in parallel with the series path consisting of rectifier element 66, solenoid 67 shunted by capacitor 68, and normally closed switch 69. Capacitor 65 is provided to act as a high frequency by-pass for the output circuit to suppress instantaneous noise surges which may occur during operation of solenoid 45. Rectifier 66 may be either a dry type rectifier or a vacuum tube type depending upon the design requirements. It is poled to oppose the flow of direct current from the $B^+$ supply.

The input circuit for tube 32 consists of a grid leak resistor 70 connected between the control grid 34 and ground and a connection from the grid to relay armature 71. In the position shown for element 71, the grid circuit is connected to the output of pre-amplifier 72 by means of conductor 73 and back-contact 74. In the operative position of armature 71, the grid is connected through contact 75 to the center terminal of a coaxial type socket 76, the outer terminal of which is connected to ground. This socket is provided for connection of a crystal phonograph pickup to the amplifier input. Naturally any other suitable means of connection may replace the coaxial type socket.

An induction pickup coil 77 has one end grounded and the other end connected through the inner conductor 78 of shielded cable 79 to the input of pre-amplifier 72. The cable shield is connected to ground. An adjustable resistor 80 is connected through normally closed contacts 81 of solenoid operated switch 82 in parallel with pickup coil 77.

The switch 82 has a pair of normally open contacts 83 which, when closed, complete the circuit connecting a timing motor 84 across terminals 85 to which is connected a source of alternating current. Alternating current is preferable to direct current because of its ready availability and its inherent advantages when operating timing or clock-like apparatus. The motor 84 is shunted by the series circuit comprising neon indicating lamp 21 and current limiting resistor 86. As indicated diagrammatically in the drawing, switch 82 is operated by solenoid 67 and is provided with mechanical means for retaining it in the operated position after the solenoid is deenergized. The switch 82 is reset by a mechanical connection with motor 84, the details of which will be described later. In addition, motor 84 mechanically controls the operation of switch 69 previously described and switches 87 and 88. Switch 87 is normally open but when closed it completes the circuit from point 89 through motor 90 to ground and from point 89 through normally closed switch 88 and solenoid 45 to ground. Motor 90 is provided for operating a turntable associated with the pickup (not shown) which is connected to socket 76 and for also operating wire or tape recording mechanism associated with the magnetic recording head (not shown) which is connected to socket 60.

The mechanical aspect of the controller unit will now be described in connection with Figs. 3–8 inclusive. Like numerals will be employed wherever applicable to designate the elements schematically illustrated in Fig. 2. The pickup coil 77 is shown set in the upper surface of base 11. It is positioned so as to be excited by both the ringing currents and audio signals received by the telephone directly above it. The excitation is caused in a well-known manner by magnetic induction.

The housing 12 contains the remainder of the controller unit elements and comprises a frame or chassis 100 mounted therein, having a front wall 101 and top and bottom walls 102 and 103, respectively. Walls 102 and 103 are parallel to each other and at right angles to wall 101. The bottom wall 103 is spaced from the base 11 by means of blocks 104 in order to provide a compartment for housing the motor 84. The motor 84 may be a conventional synchronous type clock motor and for reasons which will be apparent its output is reduced by proper gearing to ½ R. P. M. A shaft 105 is journaled in the top and bottom walls 102 and 103 of the chassis and keyed or otherwise secured to the driving shaft of motor 84. As shown, the shaft is located midway between the side edges of the chassis and spaced a suitable distance from the front wall 101. The upper end of shaft 105 is provided with an eccentric portion 106 and an annular lip or flange 107.

A laterally extending arm 108 is adjustably mounted on shaft 105 near the bottom wall of the chassis by means of collar 109 and set screw 110. A sub-chasis 111 is mounted at the left side of chassis 100 and supports solenoid 67 above switch 82. The solenoid is provided with an L-shaped armature 112 pivoted at 113 and arranged so that its horizontal leg when urged downward, as a result of attraction of the vertical leg by the solenoid, will contact and operate button 114 of switch 82. The latter is a microswitch adapted to be operated by a light pressure and is the type which has two buttons, one for closing the switch and the other for opening the switch. The second button of switch 82, namely button 115, is positioned so that it is within the confines of the circle circumscribed by the outer tip of arm 108 when shaft 105 is rotated. Therefore, by suitably positioning collar 109 vertically on shaft 105, for example by means of an annular channel 110*a* in the shaft in which the set screw 110 may ride, the arm 108 can be caused to contact and operate button 115 whenever the shaft is rotated through a pre-set portion of one revolution. Adjustment of the horizontal position of arm 108 about the shaft will determine the amount of shaft rotation required. It can thus be seen that if the shaft is constrained to start always from the same position and is rotated at constant speed, we have means for determining a first timing interval. It should be noted that for best results a slight transverse curvature should be imparted to arm 108, as shown in the drawing. This will provide a camming action between 108 and 115.

The front wall 101 of the main chassis 100 is provided with a horizontal slot 120 located as shown in the drawings. The lifting tongue 16 is pivotally supported in said slot. For ease in description, the tongue will be considered as composed of two parts, an exterior part 121 extending in front of wall 101, and an interior part 122 extending to the rear of said wall. The width of the blade which comprises tongue 16 is reduced immediately before it passes outwardly through slot 120 in order to provide a pair of shoulders 122*a*, one on either side of the blade. See Fig. 7*a*. The slot 120 is dimensioned so that the pair of shoulders limit the movement of the blade towards the exterior of the housing 12; that is, the shoulders abut the inner surface of wall 101. Any tendency of the blade to move further into the housing is opposed by the shaft 105 and the action of the helical spring 123, the details of which will be more fully described below.

As seen in the drawings, the exterior part 121 of the tongue 16 extends from the chassis wall 101 through a slot 124 in the housing shell outwardly and over the base 11. When the telephone set is in position on the base, the extending tongue portion 121 passes between the cradle U's 125 and under the handset 15. There is sufficient space between the handle portion of the handset and the top of the phone base between the U's to accommodate the tongue 16 without elevating the handset. The interior part 122 of the tongue 16 extends inwardly from the chassis wall at a slight angle from the plane of the exterior part 121. The apex of the angle formed between the interior and exterior parts is located at the slot 120. The reason for providing this angular relationship will be apparent when the operation of the apparatus is understood. An opening 126 is provided intermediate the side edges of the interior portion through which the shaft 105 passes. The opening is larger than the diameter of the shaft in order to permit the tongue to oscillate in a vertical plane with slot 120 acting as the fulcrum. On one side of opening 126 the blade extends rearwardly beyond the shaft 105 until it is over a pair of microswitches 69 and 87. These switches are pivotally mounted on sub-chassis 111, by means of screw 129 and nut 130. This mode of mounting the switches permits them to be adjustably positioned about the screw as an axis to thereby determine the extent of travel of the rearward extension 131 of tongue part 122 required to operate the switching mechanism. The switches are so positioned in conjunction with the angle made by the two portions of the lifting tongue 16 that three possible conditions of operation are available. These will be discussed below.

On the other side of opening 126 there is a first portion which is bent out of the plane of the interior part 122 into a plane at right angles thereto to form a depending arm 132. A second portion further removed from opening 126 is bent upwardly and reentrantly to form a hook element 133.

The helical spring 123 is mounted on shaft 105 and has its upper end secured to the shaft in any well-known manner at 134. The lower extremity of the spring engages the end of depending arm 132. The spring is selected to have sufficient power to rotate the shaft 105 against the load developed by the gearing and armature of the motor 84 and associated driving mechanism when the motor is deenergized but the spring has insufficient strength to resist rotation of the shaft in the reverse direction when the motor 84 is energized. In order to limit the rotation of shaft 105 in the clockwise direction, the shaft is provided with a pin 136 mounted thereon so as to extend at right angles from the axis of the shaft and of sufficient length to engage the vertical portion of hook element 133. A roller 137 is rotatively mounted on pin 136 adjacent the shaft 105. The roller and pin are arranged so that the horizontal plane tangent to the lowermost point of the roller lies in the plane of the upper surface of interior part 122 when the latter is in a horizontal position. Thus, when the interior part is horizontal, the shaft 105 can rotate and roller 137 will roll over the surface of the tongue member. In operation, it is the movement of the roller which causes the interior part 122 to assume the horizontal position and remain there.

Now it is possible to describe the three main operating positions referred to above. With the handset 15 resting on the exterior part 121 of the tongue the weight of the handset is sufficient to depress part of the tongue causing the blade to rotate about its fulcrum against the resistance of spring 123. The interior part 122 assumes the position shown in Fig. 5. It makes a sufficient angle with the horizontal to raise the rearward extension 131, free of the microswitches 69 and 87, thereby permitting them to both assume their inoperative position. If the handset 15 is removed from the exterior portion of the tongue, as would be the case when an outgoing call is manually instituted, the force exerted upon the depending arm 132 by the spring 123 is sufficient to cause rotation of the tongue about its fulcrum until movement is interrupted by the reentrant portion of hook 133 engaging the end of pin 136. In this position, as shown in Fig. 6, the interior part is still at an angle with the horizontal and the rearward extension 131 has depressed both microswitch operating arms 138 and 139. But the position of the switches and other components is such that only the switch nearest the fulcrum is depressed sufficiently to change its operating condition. In the present case, the switch 69 opens its circuit when operated in order to deactivate or disable the answering circuit in a manner to be subsequently related. This condition is essential when it is desired to make a manual call in order to eliminate interference from the answering equipment.

Assuming that the handset has been replaced and the tongue has returned to the position first discussed in connection with Fig. 5, we can now consider the operational cycle of the device. In response to an incoming ring, the motor 84 will be energized to cause rotation of shaft 105. There is a slight clearance between the tongue 16 and the roller 137 which permits pin 136 to rotate free of hook 133 before the roller causes the tongue to rotate about its fulcrum by depressing the interior part 122. The interior part is depressed until it is horizontal thus operating both switches 69 and 87 and causing the exterior part 121 to raise the handset sufficiently from cradle 14*a* to permit the button switches of the telephone set to be operated, as best shown in Fig. 7. The caller's message can then be superintended after which the motor 84 is deenergized and spring 123 returns shaft 105 to its starting position, thus restoring the handset 15 to the cradle 14*a*.

Switch 88 described in connection with the schematic diagram is a microswitch which is pivotally mounted on the top of chassis wall 102. It is frictionally mounted on pin 140 about which it can be rotatively adjusted. It will be seen that when properly adjusted the eccentric portion 106 of shaft 105 will have a camming action upon the operating lever 142 of switch 88, and will cause the switch to operate after shaft 105 has rotated a predetermined amount from its starting position. The amount of rotation required and, therefore, the time interval can be adjusted by moving lever 142 nearer to or further from, eccentric 106 by rotating switch 88 about pin 140. This adjustment may be accomplished from the exterior of the housing 12 by means of button 22 which is connected to resilient element 143. Element 143 has one end fastened to the side of the body of switch 88 and is bent so as to cause its free end to normally pass above the end of shaft eccentric 106. When it is desired to adjust switch 88 the button 22 is manually depressed, bringing the free end of element 143 below the level of flange 107, as seen in Fig. 4. The motor 84 is started and shaft 105 rotates causing the eccentric 106 to engage the edge of element 143. The flange 107 extends over element 143 to retain it in engagement. Further rotation of eccentric 106 urges 143 before it thus rotating switch 88 about pin 140. When motor 84 has rotated shaft 105 for the desired time, the current is shut off. Spring 123 restores shaft 105 to its starting position, thus disengaging the eccentric from element 143.

As seen in Fig. 8, the edge of element 143 which contacts eccentric 106 is not parallel to the longitudinal axis of the switch body. The position and angle of this particular edge is arranged so that when element 143 is engaged with the eccentric 106, said edge will lie in the same vertical plane that the operating lever 142 must lie in just prior to operation of the contact elements of the switch 88. As a result, the switch 88 will be operated at the time shaft 105 reaches the furthest point attained in its rotation while engaging element 143. This provides a simple method by which the point of operation of switch 88 can be fixed. Of course, the switch 88 can be moved manually by sliding button 22 in arcuate slot 12*a* in the housing 12.

The loudspeaker 39 is shown mounted on one side of the front wall 101 of chassis 100. Wall 101 is provided with an opening conforming to the base of the speaker cone through which the generated sound is communicated to the space between wall 101 and the curved portion of housing 12. This space or chamber extends throughout the entire width of the housing and communicates with the exterior by means of grill 20.

The operation of the equipment will now be explained for a full cycle of automatic operation. Assuming someone calls the telephone being supervised. The ringing current which is at low audio frequency (usually 20 C. P. S.) is picked up by the induction coil 77 and fed to the preamplifier 72 from which it is applied over contact 74 and armature 71 to the control grid 34 of tube 32. The low frequency signal is amplified by the tube and the output is developed across transformer primary winding 36. The speaker circuit is open in the initial position of armature 43 and, therefore, the ringing current is not fed back through the speaker to the telephone. The motor 90 for operating the recorder mechanism connected to socket 60 is stationary and, therefore, the ringing signal is not recorded. The filter comprising resistor 56 and capacitor 57 attenuates the low frequency and suppresses a "ping" or "blurp" from being recorded by the magnetic recording head on the stationary recording medium. The only remaining output circuit is that including solenoid 67. The low frequency ringing current is rectified by element 66 and applied to the solenoid. Capacitor 68 acts to filter the rectified signal and eliminate chatter of the armature 112. Solenoid 67 is thereby energized and causes switch 82 to be operated in the manner indicated above. When switch 82 operates, normally closed contacts 81 are opened while normally open contacts 83 are closed. Contacts 81 when closed connect resistor 80 across the pickup coil 77 to reduce the sensitivity of the pickup circuit in the standby condition. This is necessary in order to enable the overall amplification of the system to be high for proper response to the voice signals. That is, the ringing current is relatively strong in comparison with the voice currents and, therefore, there must be some manner of changing the sensitivity. After the ringing current has been utilized to operate solenoid 67, the resistor 80 may be removed from the circuit to increase the sensitivity. It will be appreciated that under certain circumstances of adjustment of the circuit constants and in the absence of strong spurious signals it will be possible to eliminate resistor 80 entirely.

Closure of contacts 83 results in connecting motor 84 with the source of alternating current connected to terminals 85 and energizes signal lamp 21. In the manner set forth above, motor 84 drives shaft 105 to operate tongue 16 elevating the handset 15 from its cradle and causing switches 69 and 87 to be operated in sequence. With proper proportioning of the mechanism in relation to the speed of shaft 105 the tongue 16 can be caused to operate switch 69 after approximately 2 seconds; the handset can be raised sufficiently to close the telephone circuit about 4 seconds later; and switch 87 can be closed about 1 second later, the entire conditioning operation taking from 7 to 8 seconds.

Operation of switch 69 opens the circuit to solenoid 67 in order to remove it from the output of tube 32 where it might distort the voice signals. Operation of switch 87 connects alternating current to the motor 90 to start the record player and recorder mechanisms (both not shown). At the same time current is applied through normally closed contacts 88 to solenoid 45. Solenoid 45 operates armatures 43, 61, and 71, to close the speaker circuit, ground the input to socket 60, and substitute the signals supplied by socket 76 for the output from the preamplifier 72, respectively. At the same time, solenoid 45 causes the crystal pickup associated with socket 76 to be lowered into contact with a disc recording. The disc is rotated by motor 90 and contains the outgoing message which has been previously transcribed. This message is fed to tube 32 and thence to speaker 39. The message emerging from the speaker will be picked up by the handset 15 and transmitted to the caller.

Now assuming that the message takes 20 seconds to be relayed, switch 88 will have been adjusted so that eccentric 106 on shaft 105 causes it to operate after, say 22 seconds. Operation of switch 88 interrupts the energizing circuit for solenoid 45 thereby restoring the armatures 43, 61 and 71 and the crystal pickup to their initial positions. This conditions the tube 32 to receive the caller's message and feed it to socket 60 from which it is applied to a magnetic recording head of conventional design. The oscillator 63 is illustrated to show the known method of erasing existing messages on the recording medium just ahead of the recording head.

After a time determined by the setting of arm 108, which may be up to a little short of 2 minutes from the start of the cycle, the button 115 will be engaged restoring switch 82 to its initial condition. This interrupts the current to the entire alternating current circuit and reconnects resistor 80 across coil 77. Upon de-energization of motor 84, the spring 123 restores shaft 105 in the manner described, thereby restoring switches 88, 87, and 69, in the order named, and replacing handset 15 to their standby positions. The system is now ready to supervise another call.

In setting switch 88, the preferred procedure is to commence a cycle playing the outgoing message and engaging element 143 by pressing button 22. When the message has terminated a switch (not shown) is operated to de-energize the motor 84. Thus switch 88 will be left in the desired position. The system may be designed so that the point of operation of switch 88 is slightly after the point at which the motor is de-energized in the above procedure in order to insure complete transmission of the outgoing message.

It will be appreciated that the foregoing is descriptive of preferred forms of this invention, and it will, therefore, be understood that other forms and variance of these forms may be had within the broad scope and coverage of the invention.

Having thus described our invention, what we claim as new and desire to secure by Letters Patent, is:

1. A robot telephone attendant comprising an electron discharge device having at least a control grid and an output electrode; a load impedance, said impedance being connected between said output electrode and a terminal for supplying operating current; a solenoid device; rectifier means, said rectifier means being connected in series with said solenoid device across said load impedance for deriving a signal from across said impedance for operating said solenoid device; signal pick-up means arranged to be coupled to a telephone set, said pick-up means being coupled to said control grid; and a control circuit comprising apparatus for answering said telephone set, said solenoid device being coupled with said control circuit to initiate the operating thereof in response to a ringing signal detected by said pick-up means, a circuit interrupting device, said circuit interrupting device being electrically connected to said solenoid device for disconnecting said solenoid in response to manual operation of said telephone set.

2. A robot telephone attendant according to claim 1 comprising a support arranged to be positioned adjacent said telephone set; a lifting tongue pivotally mounted intermediate its ends on said support, one end of said tongue being adapted for positioning under the handle of the telephone handset, the other end of said tongue being in operative engagement with said circuit interrupting device whereby manual elevation of said handset will cause operation of said interrupting device.

3. A robot telephone attendant according to claim 2 wherein said control circuit comprises a timing element, and lifting tongue operating mechanism, said mechanism being controlled by said timing element and constructed and arranged to depress said other end of the tongue element to thereby elevate the telephone handset, said circuit interrupting device being operated by said other end of the tongue element to disconnect said solenoid device.

4. A robot telephone attendant according to claim 3 wherein said timing element comprises a motor and a shaft, said shaft being connected to said motor, and said operating mechanism comprises a cam device motivated by said shaft and arranged to depress said other end of the tongue element.

5. A robot attendant for use with a telephone having a base and a handset comprising in combination control means for sequentially raising the telephone handset in response to a ringing signal, causing operation of message delivering means for communicating an outgoing message signal to the handset transmitter, and causing operation of recording means for storing an incoming message signal communicated to it by the handset receiver; said control means comprising an operating lever upon which the handset can be placed, said lever being arranged to assume a first position under the weight of said handset and a second position in the absence of said handset, and switch means connected in circuit with said control means and operable by said lever to prevent operation of said control means when said handset is not in place.

6. A robot attendant for use with a telephone having a base and handset comprising in combination lifting means constructed and arranged for raising the telephone handset in response to a ringing signal, message delivering means mounted adjacent said lifting means for communicating an outgoing message to the handset transmitter, recording means arranged to store an incoming message signal, and a single electro-mechanical timing device mechanically coupled to said lifting means and electro-mechanically coupled to said message delivering and recording means for operating said lifting, message delivering, and recording means in the order stated, and comprising a support, said lifting means consisting of a rigid tongue member pivotally mounted on said support and having a forward portion arranged to lift the telephone handset bodily vertically, and a rearward portion positioned adjacent a first switch means which is connected in a circuit for causing said message delivering means to operate, a second switch means positioned adjacent said rearward portion of the lifting means for operation thereby, said second switch means being coupled to means for initiating operation of said timing device, said second switch means being in a circuit for disabling said last mentioned means upon operation of said lifting means.

7. A robot attendant for use with a telephone having a base and handset comprising in combination lifting means constructed and arranged for raising the telephone handset in response to a ringing signal, message delivering means mounted adjacent said lifting means for communicating an outgoing message to the handset transmitter, recording means arranged to store an incoming message signal, and a single electro-mechanical timing device mechanically coupled to said lifting means and electro-mechanically coupled to said message delivering and recording means for operating said lifting, message delivering, and recording means in the order stated, and comprising a support, said lifting means consisting of a rigid tongue member pivotally mounted on said support and having a forward portion arranged to lift the telephone handset bodily vertically, and a rearward portion, and further comprising starting means coupled to said timing device for initiating operation thereof and switch means under the control of said rearward portion of the lifting means and coupled to said starting means for disabling said starting means when the lifting means is operated.

References Cited in the file of this patent

UNITED STATES PATENTS

| | | |
|---|---|---|
| 818,377 | Hewlett | Apr. 17, 1906 |
| 1,269,079 | Hammond | Oct. 12, 1917 |
| 2,005,788 | Keiser | June 25, 1935 |
| 2,261,420 | Shively et al. | Nov. 4, 1941 |
| 2,374,842 | Shively et al. | May 1, 1945 |
| 2,393,272 | Van Deventer | Jan. 22, 1946 |
| 2,539,139 | Jordanoff et al. | Jan. 23, 1951 |
| 2,549,548 | Von Zimmermann | Apr. 17, 1951 |
| 2,658,107 | Zimmermann | Nov. 3, 1953 |
| 2,673,241 | Van Deventer et al. | Mar. 23, 1954 |